No. 618,472. Patented Jan. 31, 1899.
W. H. LAING.
CUT-OFF VALVE FOR HOSE.
(Application filed Sept. 9, 1897.)
(No Model.)
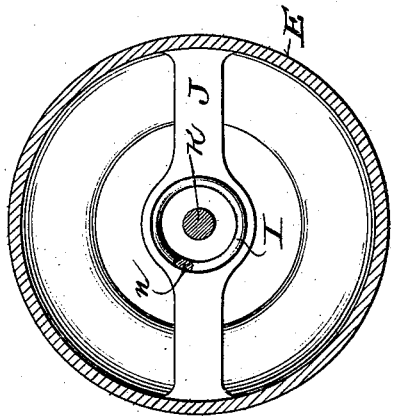
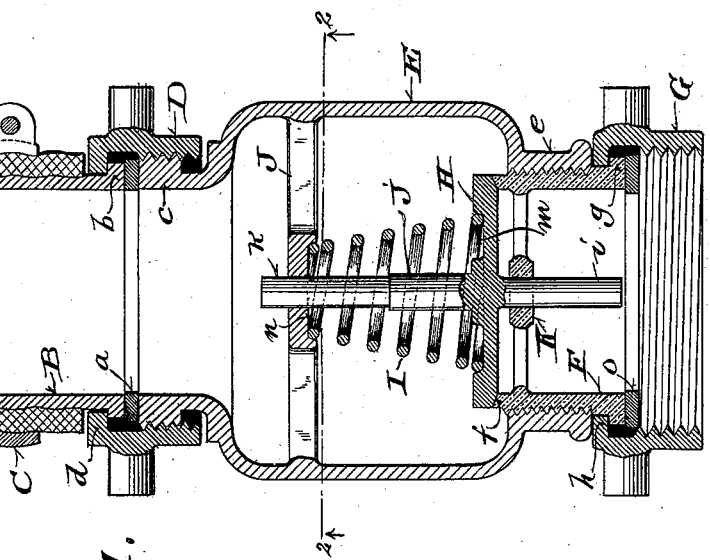

UNITED STATES PATENT OFFICE.

WILLIAM H. LAING, OF RACINE, WISCONSIN.

CUT-OFF VALVE FOR HOSE.

SPECIFICATION forming part of Letters Patent No. 618,472, dated January 31, 1899.

Application filed September 9, 1897. Serial No. 651,027. (No model.)

*To all whom it may concern:*

Be it known that I, WILLIAM H. LAING, a citizen of the United States, and a resident of Racine, in the county of Racine and State of Wisconsin, have invented certain new and useful Improvements in Cut-Off Valves for Hose; and I do hereby declare that the following is a full, clear, and exact description thereof.

My invention has especial reference to the hose employed for filling the water-receptacle of sprinkling-carts, though not necessarily restricted thereto; and it consists in certain peculiarities of construction and combination of parts, as will be fully set forth hereinafter and subsequently claimed.

In the drawings, Figure 1 is an end view of the filling-hose of a water or sprinkling cart with my improved device attached thereto, the latter being shown in longitudinal section. Fig. 2 is a transverse sectional view on the line 2 2 of Fig. 1.

One serious objection resulting from the filling of sprinkling-carts from the ordinary hydrants in cities and villages has been the flow of water from the filling-hose after the water-receptacle on the cart has been filled and said hose disconnected from the hydrant, this waste water forming objectionable sloppy and muddy places adjacent to said hydrants; and one object of my present invention has been to obviate this condition, as by the use of my device the water is retained within the filling-hose and its passage from the outer end thereof instantly cut off the moment the vehicle has received the proper supply and the hydrant-outlet is closed.

Referring to the drawings, A represents the outer end of a hose-pipe—such, for example, as is used as the filling-pipe for sprinkling-carts hereinbefore named.

B is the cylindrical metallic end, secured within the open end of the hose A, as by the split clamp C or other suitable device, said end B having an exterior annular flange $b$ to retain the internal annular flange $d$ on the coupling D.

E is the valve-chamber of my device, having at one end a neck $c$, provided with exterior screw-threads for engagement with the interior screw-threads of the coupling D when the two parts are united, as shown in Fig. 1, with a gasket or other suitable packing $a$ interposed between the adjacent ends of the parts B E, the interior diameter of the neck $c$ being preferably the same as that of the part B of the hose end. The opposite end of the valve-chamber E is formed with a neck $e$, preferably of greater diameter than that of the neck $c$ and provided with interior screw-threads for engagement with exterior screw-threads on the open cylinder F, whose inner end projects within the said valve-chamber E to form a valve-seat $f$, while the outer end is provided with an exterior annular flange $g$ to retain the internal annular flange $h$ of the coupling G, and the internal diameter of the cylinder F being preferably the same as that of the neck $c$ and part B described.

H is the valve, from the outer side of which projects the guide-rod $i$, while from its inner side there projects the guide-rod $j\ k$. The inner face of the valve H is preferably formed with an annular recess $m$ to receive the adjacent coil of a spring I, which is preferably of a substantially conical form and which spring surrounds the guide-rod $j\ k$, the coil at the opposite end of said spring bearing against the brace-piece J and being preferably seated in an annular or circular recess $n$ in the center of said brace-piece.

K is a brace-piece extending across the cylinder F, adjacent to the inner end thereof, said brace-piece being centrally perforated for the passage therethrough of the guide-rod $i$, while the other brace-piece J is similarly centrally perforated for the reception of the end $k$ of the other guide-rod $j\ k$, the part $j$ of said guide-rod being of greater diameter than that of the perforation in the brace-piece J, through which the said end $k$ passes, so that the inward movement of the valve H will be stopped when the shouldered end of the part $j$ of the guide-rod comes in contact with the brace-piece J before the spring I is fully compressed.

The outer end of the coupling G is formed with interior screw-threads, as shown, for engagement with the ordinary hydrant-outlet, said coupling G being made of the usual standard size for this purpose, and is preferably provided with a gasket or packing-ring $o$.

The operation of my device will be readily understood from the foregoing description of its construction, taken in connection with the accompanying drawings. When it is desired to fill the water-receptacle of the sprinkling-cart through the said filling-hose A, the coupling G is screwed onto the hydrant-outlet and the hydrant-valve opened, when the water under pressure in said hydrant will enter the cylinder F and force the valve H inwardly off its seat $f$ and flow through the valve-chamber E and its neck $c$ and hose end B into the hose A and said water-receptacle. When the latter has been filled to the desired point, the hydrant-valve is closed and the coupling G disengaged from the hydrant-outlet, and then the spring I will restore the valve H to its seat against the inner end of the cylinder F (the guide-rods $i$ and $j\ k$ insuring the accuracy of said seating) and the water that was in the hose A will be retained therein, all that escapes from the outer end of my device being the inconsiderable quantity within the cylinder F, thereby avoiding the slop and waste hereinbefore referred to as usual and objectionable.

My improved device when once applied to the end of the hose A is designed to be permanently retained thereon, always ready for use when the water-receptacle connected to said hose is to be filled, although, if necessary for repair or other purpose, readily detachable by unscrewing the neck $c$ from the coupling D.

To obtain the best results from my device, the internal diameter of the neck $c$ and cylinder F should not be greater than that of the hose to which it is applied and the valve-chamber E need be of only sufficiently greater diameter to admit of the ready placing of the valve therein, thus making a very light, strong, and compact device.

In putting the parts together the valve H and spring I are first slipped within the chamber E, with the end $k$ of the inner guide-rod $j\ k$ inserted in the described central opening of the brace-piece J, and then the cylinder F is screwed to place, receiving the guide-rod $i$ in the central opening of its brace-piece K, and the internal diameter of the neck $e$ should be just large enough to enable the valve H to slip through before the cylinder F is applied to form the seat for said valve, as described.

Having thus described my invention, what I claim as new, and desire to secure by Letters Patent, is—

1. A cut-off valve for hose, comprising a valve-chamber having a communicating neck at each end, the inner neck having exterior screw-threads for engagement with a coupling at the end of a hose, and the outer neck having interior screw-threads; a brace-piece extending across the interior of said valve-chamber and provided with a central perforation; a cylinder having exterior screw-threads for engagement with the said outer neck and projecting within the valve-chamber to form a valve-seat; a brace-piece extending across the interior of said cylinder and provided with a central perforation; a longitudinally-movable valve provided with guide-rods extending from the opposite faces thereof for engagement with the central openings in said brace-pieces, and the portion of the inner guide-rod adjacent to the valve being of greater diameter than that of the opening in the brace-piece through which the end of said guide-rod projects; a spiral spring surrounding said inner guide-rod and bearing against the inner face of the said valve and the opposing face of the brace-piece within the valve-chamber; and a coupling supported by said cylinder and having interior screw-threads for attachment to a hydrant-outlet.

2. The combination with a hose-pipe of a cylinder secured within the outer end thereof and having an externally-flanged projecting outer end; a coupling supported by said cylinder and having interior screw-threads; a valve-chamber having a communicating neck at each end, the inner neck having exterior screw-threads for engagement with said coupling and the outer neck having interior screw-threads; a transverse centrally-perforated brace-piece within said valve-chamber; a cylinder having exterior screw-threads for engagement with the said outer neck, the inner end of said cylinder projecting within said valve-chamber, forming a valve-seat, and the outer end of said cylinder having an external annular flange thereon; a transverse centrally-perforated brace-piece within said cylinder; a longitudinally-movable valve provided with guide-rods extending from the opposite faces thereof for engagement with the central openings in said brace-pieces, and the portion of the inner guide-rod adjacent to the valve being of greater diameter than that of the opening in the brace-piece through which the end of said guide-rod projects; a spiral spring surrounding the inner guide-rod and bearing against the inner face of the said valve and the opposing face of the brace-piece within the valve-chamber; and a coupling supported by the flanged end of said cylinder and having interior screw-threads for attachment to a hydrant-outlet.

In testimony that I claim the foregoing I have hereunto set my hand, at Milwaukee, in the county of Milwaukee and State of Wisconsin, in the presence of two witnesses.

WILLIAM H. LAING.

Witnesses:
H. G. UNDERWOOD,
B. C. ROLOFF.